United States Patent [19]

Dashner

[11] 4,172,465
[45] Oct. 30, 1979

[54] CHECK VALVE

[75] Inventor: James W. Dashner, Matthews, N.C.

[73] Assignee: Conbraco Industries, Inc., Matthews, N.C.

[21] Appl. No.: 850,479

[22] Filed: Nov. 7, 1977

[51] Int. Cl.² ............................................. F16K 15/06
[52] U.S. Cl. ............................ 137/533.27; 137/543.15
[58] Field of Search ........................ 137/543.15, 533.27

[56] References Cited

U.S. PATENT DOCUMENTS 1,844,613  2/1932  Thompson .................. 137/533.27 X

FOREIGN PATENT DOCUMENTS 1044537 11/1958 Fed. Rep. of Germany ...... 137/543.15
1500169  5/1969 Fed. Rep. of Germany ...... 137/543.15

Primary Examiner—William R. Cline
Attorney, Agent, or Firm—Richards, Shefte & Pinckney

[57] ABSTRACT

A check valve having a semi-spherical valve member movable longitudinally in a generally tubular housing between a closed position engaging a conical valve seat and an open position spaced longitudinally therefrom, the valve member being slidably mounted for such movement on a longitudinally extending support element. The opening in the valve member which receives the support therein has a diameter significantly greater than the diameter of the support element whereby the valve member is pivotal thereon so as to seat properly on the valve seat. The center of the semi-spherical valve member is longitudinally spaced in one direction from the effective center of support thereof at the closed position of the valve member, and is longitudinally spaced in the opposite direction from the effective center of the valve member at the open position of the valve. The valve housing is specially formed to provide a flow path around said valve member which corresponds generally in area to the valve inlet and outlet openings to reduce the pressure loss of the fluid passing through the valve.

7 Claims, 2 Drawing Figures

CHECK VALVE

BACKGROUND OF THE INVENTION

Check valves are well-known and widely used in fluid systems of various types to permit fluid flow in one direction therethrough while preventing fluid flow in the opposite direction. Such check valves have a variety of different forms, principally ball check valves in which a spherical ball is held by a spring adjacent a seat until opened by fluid pressure overcoming the spring bias, flapper valves in which a generally flat valve member is pivoted between open and closed positions, and check valves having generally conical valve members operating in a similar manner as the aforesaid ball check valve.

These known types of check valves are generally satisfactory in terms of carrying out this intended function of permitting one-way flow through a fluid line, but they frequently have undesirable side effects. For example, it is desirable for the valve member to be somewhat loosely held in its movable mounting arrangement so that it can adjust to some extent for accommodating slight misalignment with its seat, but loosely held valves will usually suffer the disadvantage of excessive vibration resulting from the forces of the fluid acting thereagainst when the valve member is at its open position. Antithetically, if the valve member is tightly held during its opening and closing movement to prevent excessive vibration, it will often not seat properly on the valve seat when it closes, thereby resulting in undesirable leakage past the valve member. Additionally, conventionally check valves generally have high pressure losses thereacross, particularly where the fluid flowing therethrough must alter direction significantly, as in most flapper valves, or where the cross-sectional flow area through the valve varies substantially along the longitudinal extent of the valve.

In accordance with the present invention, a check valve is provided which substantially overcomes many of the aforesaid drawbacks of conventional check valves, and which is simple and relatively inexpensive to produce.

SUMMARY OF THE INVENTION

The check valve of the present includes a tubular housing having a conical valve seat at one end thereof, and a valve member formed with a semi-spherical seating surface, such valve member being movable between a first closed position engaging the conical valve seat and a second open position spaced longitudinally from the valve seat. The interior of the valve housing is provided with a valve member support element extending longitudinally thereof, and the valve member is formed with a longitudinally extending opening for receiving the aforesaid support element whereby the valve member is carried on the support element during movement between the open and closed positions of the valve member.

In accordance with a feature of the present invention, the longitudinal opening in the valve member has a cross-sectional area significantly greater than the corresponding cross-sectional area of the support element so that the valve member is somewhat loosely carried on the support element to permit some predetermined pivotal movement of the valve members with respect to the support element whereby the semi-spherically formed seating surface of the valve member can adjust its seating disposition to fit flush against the conical valve seat even if there is some misalignment, because of normal manufacturing variations between the valve seat and the valve member. As a result, the valve member will be seated properly on the valve seat to prevent leakage therepast. Additionally, the clearance between the support element prevents binding of the valve member on the support element if small foreign particles in the fluid should be disposed therebetween, and any such foreign particles will normally be flushed out the valve member opening because of the pumping action exerted by the fluid in the valve member opening during the opening movement of the valve member along the support element. In the preferred embodiment of the present invention, the clearance between the valve member opening and the support element is approximately 6 to 10 percent of the diameter of the valve member opening.

Even though the valve member is somewhat loosely carried on the support element, as described above, the tendency of the valve member to vibrate or "rattle" is reduced by the particular mounting arrangement of the valve member on the support element. More specifically, the valve member is carried on the support element so that the center of the semi-spherical valve member seating surface is longitudinally spaced in one direction from the effective center of support of the valve member on the support element at the closed position of the valve member, and is spaced in the opposite direction from the effective center of its support at the open position of the valve member. As a result, the two centers coincide at some point during opening of the valve, and such centers are generally closely spaced at both the open and closed position of the valve member so that turning or rotating forces imposed on the exposed semi-spherical seating surface of the valve member by fluid acting thereagainst will be less effective because of the relatively small spacing between the two aforesaid centers, thereby resulting in less movement or vibration of the valve member.

Additionally, the housing of the check valve of the present invention is specially formed to provide a smooth, generally constant fluid flow path therethrough to reduce substantially pressure loss of the fluid as it passes through the valve. In this regard, the housing is provided with a cylindrical portion located downstream of the conical valve seat and the diameters of the housing portion and the valve member are selected to provide an annular flow path therebetween which has a cross-sectional area corresponding to the cross-sectional area at the inlet of the valve seat. Likewise, the valve member, at its open position, is located with respect to the valve seat to form a similar annular flow path. The downstream end of the cylindrical housing, which is beyond the semi-spherical valve member at its open position, is provided with a transverse flange in which one end of the support element is mounted so that the volumn occupied by the flange is compensated for by the enlarged portion of the cylindrical housing portion beyond the valve member. Finally, the housing includes an end portion downstream of the cylindrical housing portion that gradually tapers inwardly from the diameter of the cylindrical housing portion to the diameter at the valve seat inlet. All of the above provides a smooth, generally uninterrupted fluid flow through the valve with only a small pressure loss through the valve.

DESCRIPTION OF THE PREFERRED EMBODIMENT

Figure 1:
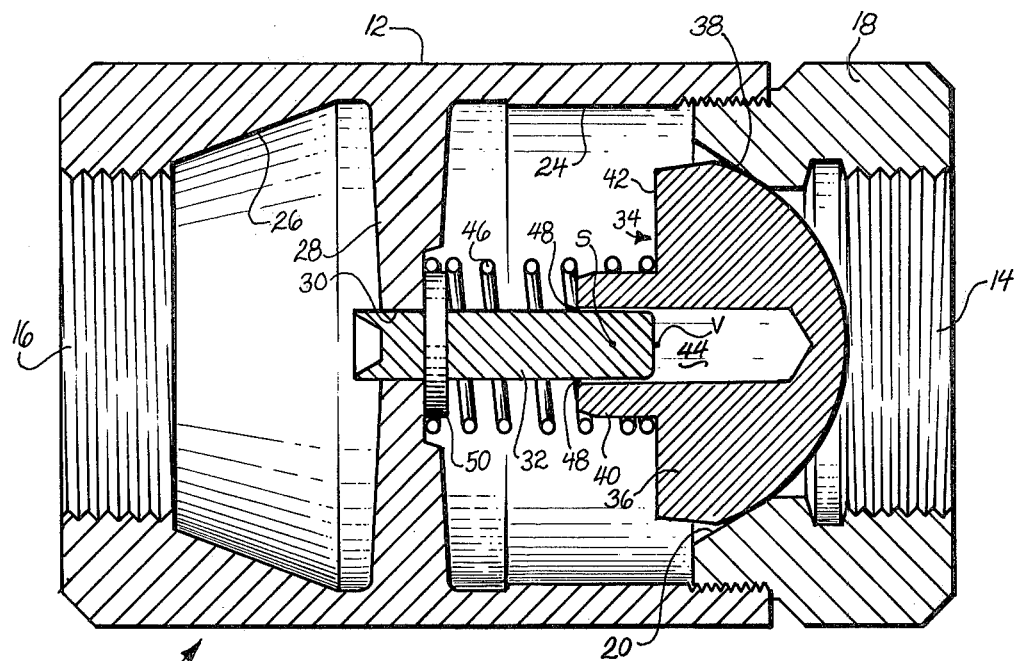
FIG. 1 is a sectional view of the check valve taken through the longitudinal center line thereof and illustrating the valve member at its closed position.
Figure 2:
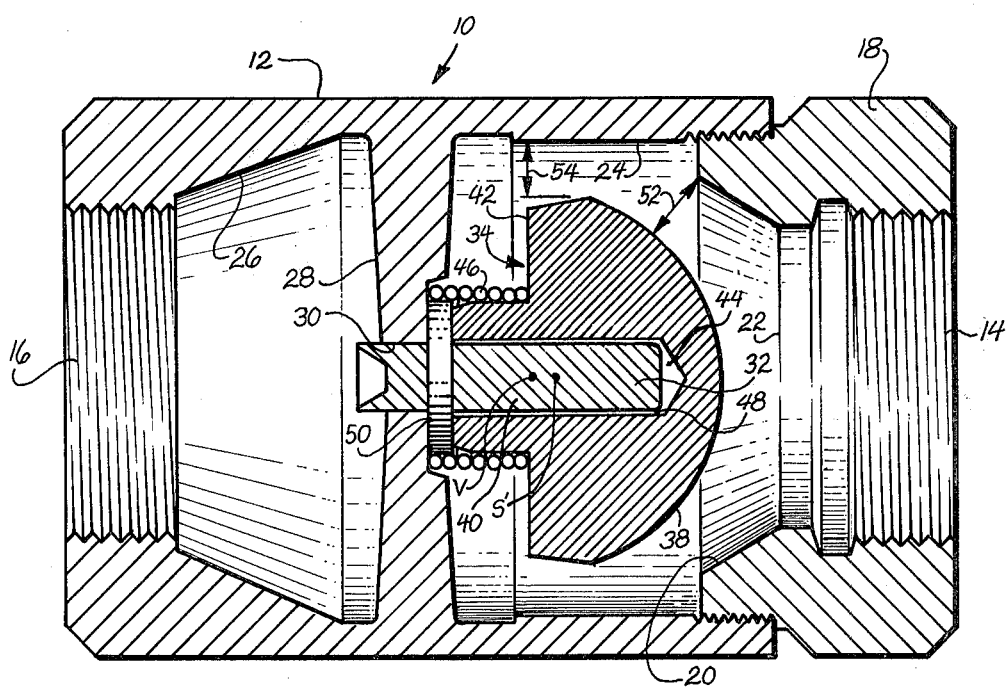
FIG. 2 is a sectional view corresponding to FIG. 1, but illustrating the valve member at its open position.

Looking now in greater detail at the accompanying drawings, FIGS. 1 and 2 illustrate the check valve 10 of the present invention which includes a generally tubular housing 12, preferably made of metal, through which fluid flows longitudinally from an inlet 14 to an outlet 16. The inlet 14 is generally cylindrical and is located at the upstream end of an inlet fitting 18, preferably made of metal, threadably received in main housing member, and the inlet fitting 18 is formed with a conical valve seat 20 having a taper of approximately thirty degrees with respect to the longitudinal center line of the valve 10, the smallest or upstream opening 22 of the conical valve seat 20 having a cross-sectional area corresponding substantially to the cross-sectional area of pipe (not shown) which would be threaded into the inlet 14. Immediately, downstream of the valve seat 20, the housing 12 is formed with a generally cylindrical portion 24 and a conical portion 26 tapering inwardly from a diameter corresponding to the diameter of cylindrical portion 24 to a diameter corresponding to the diameter of the pipe (not shown) which would be threaded into outlet 16, the internal diameter of the outlet pipe being substantially the same as the diameter of the inlet pipe.

A relatively narrow flange member 28 is mounted at the downstream end of the cylindrical housing portion 24 to extend transversely thereacross, and the center of the flange member 28 include an opening 30 for receiving one end of a longitudinally extending cylindrical support element 32, the support element 32 preferably being made of metal expanded after being placed in the opening 30, or otherwise mechanically attached, so that it will be securely held in place by the flange member 28.

A valve member 34 is provided, preferably made from a fluorocarbon or other suitable plastic or elastomer material, which includes a semi-spherical portion 36 presenting an exposed semi-spherically shaped seating surface 38, and includes a cylindrical sleeve portion 40 extending longitudinally from the flat transverse surface 42 of the semi-spherical portion 36. The valve member 34 includes a longitudinal opening 44 that extends through the sleeve portion 40 and into the semi-spherical portion 36 as shown in FIGS. 1 and 2. The longitudinal opening 44 receives the longitudinally extending support element 32 so that the valve member 34 is mounted therein for longitudinal movement between a closed portion (FIG. 1) at which the seating surface 38 engages the conical valve seat 20, and an open position (FIG. 2) at which the seating surface 38 is longitudinally spaced from the valve seat 20, a biasing spring 46 being interposed between the flat valve member surface 42 and the flange member 28 to urge the valve member 34 toward its closed position. The cross-sectional area of the valve member opening 44 is significantly greater than the corresponding cross-sectional area of the support element 32 whereby a clearance space 48 is provided between the support element 32 and the valve member opening 44. This clearance 48 permits predetermined pivotal movement of the valve member 34 with respect to the support element 32 so that the semi-spherical portion 36 of the valve member can adjust its position with respect to the conical valve seat 20 and abut such valve seat 20 at a flush disposition which assures an even abutting relationship therebetween that prevents leakage past the valve member 34. If the valve member were mounted on the support element 32 with substantially no clearance between the support element 32 and the opening 44, it will be appreciated that even a slight misalignment of the longitudinal axes of the valve member 34 and the conical valve seat 20 could result in the seating surface 38 not having a fully flush engagement with the valve seat 20 whereby some leakage past the valve member 34 may occur. The clearance space 48 provides an additional advantage in that it is large enough to prevent small foreign matter from becoming lodged between the support element 32 and the valve member opening 44 in a manner which could inhibit or prevent movement of the valve member 34 along the support element 32. In fact, by virtue of this clearance space 48, fluid can flow freely around the support element 32 and into the bottom of the valve member opening 44, and when the valve member 34 moves from its closed position in FIG. 1 to its open position in FIG. 2, any fluid trapped in the opening 44 will be pumped out of the opening 44 and through the clearance space 48 to flush out any foreign particles which may have become lodged therein.

Thus, the clearance space 48 must be large enough to give the valve member 34 sufficient freedom of movement to seat properly on the valve seat 20 and to tolerate normal amounts of foreign material, and it has been found that good results are obtained if the clearance space 48 is within the approximate range of six to ten percent of the diameter of the valve member opening 44. For example, in a commercial ½-inch size valve, the diameter of the support element 32 is about 0.141-inch and the diameter of the opening 44 is about 0.158-inch leaving a clearance of about 0.017-inch, or about 10% the diameter of the opening 44. In a 2-inch commercial valve, the diameters of the support element 32 and the opening 44 are about 0.469-inch and 0.501-inch, respectively, leaving a clearance of 0.032 inch which is about six percent of the diameter of the opening 44.

Even though the valve members 34 is somewhat loosely retained on the support element 32 because of the significant clearance 48, the tendency of the valve member 34 to vibrate or "rattle" is reduced by the unique manner in which it is supported on the support element 32. As seen in FIG. 1, when the valve member 34 is at its closed position, the support element 32 extends into the opening 44 along a longitudinal length corresponding to the length of the sleeve portion 40 so that the effective center of support for the valve member 34 will be mid-way of the length of the sleeve portion 40 as indicated by S in FIG. 1. The center of the semi-spherical valve member seating surface 38 is indicated by V in FIG. 1, and it will be noted that V is located generally adjacent to, but longitudinally spaced in the upstream direction from, S. However, when the valve member 34 moves to its open position, as illustrated in FIG. 2, the support element 32 extends substantially all the way into the opening 44 within the semi-spherical valve portion 36 so that the effective center of support for the valve member 34 changes to S', which is mid-way of the length of the support element 32 within the opening 44, and the center V of the semi-spherical valve member seating portion 38 moves to a position generally adjacent to but longitudinally spaced in the downstream direction from S'. Thus, as the valve member 34 moves to its open position, the center V moves along a longitudinal path from one side of the effective center of support to the opposite side thereof, with the center V and the effective center of support coinciding at some point during this movement and with the center V being located near the center S' when the valve member 34 reaches its fully opened position. During opening movement of the valve member 34, the fluid forces acting against the exposed semi-spherical seating surface 38 will tend to turn the valve member 34 about its center V, but, because of the above-described proximate relationship of the center V and the effective center of support during and after opening of the valve member 34, the transverse movement of the valve member 34 with respect to the housing is substantially reduced so as to minimize or eliminate any vibration of the valve member 34. More specifically, because of the proximate relationship between center V and center S', any movement of the valve member 34 will tend to be substantially rotational movement about its spherical center rather than transverse pivotal movement about a center having a substantial longitudinal spacing from the spherical center which would increase the transverse movement of the valve member 34 within the housing and thereby disrupt the uniform flow distribution of the fluid around the periphery of the semi-spherical valve member surface 38, such disruption being a primary cause of valve member vibration.

To reduce pressure loss of the fluid flowing through the valve 10, the housing 12 is specially formed with relation to the valve member 34 to provide a generally constant, uninterrupted flow path for the fluid. More specifically, the valve member 34 is arranged on the support element 32 so that when it reaches its fully opened position, that is when the extending end of the sleeve portion 40 engages the abutment plate 50 of the support element 32, the minimum spacing between the exposed seating surface 38 and the conical valve seat 20 which is indicated by line 52 in FIG. 2 will define an annular area therebetween which corresponds generally to the cross-sectional area at the smallest or upstream opening 22 of the conical valve seat 20 whereby the flow path through the upstream and downstream ends of the conical valve seat 20 remains generally the same. Similarly, cylindrical housing portion 24 has a predetermined interior diameter selected so that the minimum annular area defined between the surface 38 and the housing portion 24, designated by line 54 in FIG. 2, also corresponds generally to the cross-sectional area at the upstream opening 22 of the conical valve seat 20. Thus, the flow of fluid around and past the semi-spherical valve member portion 36 is smooth, and this flow path is generally free of sharp fluctuations in cross-sectional area. As the fluid flow continues past the semi-spherical valve member portion 36 it reaches the transverse flange member 28 which tends to reduce the area of the flow path, but because the flange member 28 is located at the downstream end of the cylindrical housing portion 24 and downstream of the open valve member 34, the area occupied by the flange member 28 is compensated by the enlarged flow area presented at the downstream end of the cylindrical housing portion 24. The aforementioned tapered housing portion 26, which is downstream of the flange member 28, then gradually tapers down to a cross-sectional area corresponding to the cross-sectional area at the inlet 14 of the valve and smallest opening 22 of the conical valve seat.

Thus, while there are some variations in area of the flow path through the valve 10, the above-described construction of the housing 12 in relation to the valve member 34 reduce these variations to a practical minimum, and the fluid flow through the valve 10 is essentially longitudinal without any substantial changes of direction or flow velocity whereby pressure loss through the valve 10 is reduced to a minimum.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. A check valve including a generally tubular housing formed with a conical valve seat, a valve member having a semi-spherical seating surface and being selectively movable longitudinally of said housing between a first closed position at which said semi-spherical seating surface engages said conical valve seat and a second open position at which said semi-spherical seating surface is located in longitudinally spaced relation to said conical valve seat, and a valve member support element extending longitudinally of said housing, said valve member being formed with a longitudinally extending opening for receiving said valve member support element, said opening having a cross-sectional area significantly greater than the cross-sectional area of said support member to permit predetermined pivotal movement of said valve member with respect to said support element, said valve member support element, said valve member and valve member longitudinal opening being dimensioned such that the center of said semi-spherical seating surface is longitudinally spaced in one direction from the effective center of support of said valve member on said support element at said closed position of said valve member, and is longitudinally spaced in the opposite direction from the effective center of support of said valve member at said open position of said valve member.

2. A check valve as defined in claim 1 and further characterized in that said valve member includes a semi-spherical portion with the exterior surface thereof forming said seating surface, a radially extending flat surface and a cylindrical sleeve portion extending longitudinally from the flat surface of said semi-spherical portion, and in that said opening in said valve member extends through said cylindrical sleeve portion and into said semi-spherical portion of said valve member.

3. A check valve as defined in claim 2 and further characterized in that said valve member support element extends into said opening along a length corresponding substantially to the length of said sleeve portion at said closed position of said valve member, and in that said support element extends into the portion of said opening within said semi-spherical valve portion at said open position of said valve members.

4. A check valve as defined in claim 1 and further characterized in that said housing includes a cylindrical portion located immediately downstream of said conical valve seat, said cylindrical housing portion having a predetermined diameter selected so that the minimum annular area defined between said cylindrical housing and said semi-spherical valve member portion corresponds substantially to the minimum cross-sectional area defined by the upstream opening of said conical valve seat.

5. A check valve as defined in claim 4 and further characterized in that the minimum annular area defined between said semi-spherical valve member portion and said conical seat at said open position of said valve member corresponds substantially to the minimum cross-sectional area defined by the upstream opening of said conical valve seat.

6. A check valve as defined in claim 5 and further characterized in that downstream end of said cylindrical housing portion is provided with a flange extending transversely thereacross, said flange having one end of said valve member support element mounted therein.

7. A check valve as defined in claim 6 and further characterized in that said housing includes a tapered portion located immediately adjacent said downstream end of said cylindrical housing portion, said tapered portion decreasing gradually from a diameter equal to that of said cylindrical portion to a diameter substantially equal to the diameter at the upstream end of said conical valve seat.

* * * * *